(12) United States Patent
Baker

(10) Patent No.: US 7,045,936 B2
(45) Date of Patent: May 16, 2006

(54) PROJECTION COUPLER WITH CONTRAST RIBS

(75) Inventor: Scott Howland Baker, Simpsonville, SC (US)

(73) Assignee: Hitachi Electronic Devices (USA), Inc., Greenville, SC (US)

( * ) Notice: Subject to any disclaimer, the term of this patent is extended or adjusted under 35 U.S.C. 154(b) by 213 days.

(21) Appl. No.: 10/656,387

(22) Filed: Sep. 5, 2003

(65) Prior Publication Data

US 2004/0061840 A1 Apr. 1, 2004

Related U.S. Application Data

(60) Provisional application No. 60/415,030, filed on Oct. 1, 2002.

(51) Int. Cl.
*H01J 29/86* (2006.01)

(52) U.S. Cl. .................. 313/35; 313/478; 359/649; 359/820; 359/823; 353/100; 353/74

(58) Field of Classification Search .................. 313/35, 313/36, 44; 353/100, 119; 348/748, 749, 348/787, 818; 359/649
See application file for complete search history.

(56) References Cited

U.S. PATENT DOCUMENTS

| 4,151,554 | A | 4/1979 | Tucker |
|---|---|---|---|
| 4,409,515 | A | 10/1983 | Kloss |
| 4,433,962 | A | 2/1984 | Kloss |
| 4,626,734 | A | 12/1986 | Greiler |
| 4,645,966 | A | 2/1987 | Van Esdonk |
| 4,673,841 | A | 6/1987 | Miyatake et al. |
| 4,688,093 | A | 8/1987 | Van der Staak et al. |
| 4,710,820 | A | 12/1987 | Roberts |
| 4,734,613 | A | 3/1988 | Gerritsen et al. |
| 4,775,817 | A | 10/1988 | Duwaer et al. |
| 4,781,870 | A | 11/1988 | Talbert |
| 4,904,054 | A | 2/1990 | Hiroshima |
| 4,964,695 | A | 10/1990 | Bradley, Jr. |
| 5,157,554 | A | 10/1992 | Kashihara |
| 5,202,706 | A | * 4/1993 | Hasegawa .................. 359/819 |
| 5,250,968 | A | 10/1993 | Numata et al. |
| 5,349,472 | A | 9/1994 | Terai et al. |
| 5,381,189 | A | 1/1995 | Terai et al. |

(Continued)

*Primary Examiner*—Joseph Williams
*Assistant Examiner*—Sikha Roy
(74) *Attorney, Agent, or Firm*—David Cunningham, Esq.; Hitachi America, Ltd.

(57) ABSTRACT

An improved coupler with contrast ribs for use in a projection system. The coupler supports a projection lens in alignment with a projection optical signal generation device (e.g., a Cathode Ray Tube). The contrast ribs minimize contrast distortion that occurs in the coupler. The coupler defines a cooling chamber between said projection lens and said projection signal generating device and is filled with liquid in order to transport the optical signal between the projection optical signal generation device and projection lens. The contrast ribs change the angle of reflection of stray light rays generated by the projection optical signal generation device and direct a portion of those stray light rays to other contrast ribs. The ribs are preferably coated with a chemical composition that helps allow the ribs to absorb a portion of each ray incident on the rib. Thus each time the stray light ray strikes a rib, a portion of it is absorbed and not reflected back thus minimizing any reductions of the overall picture contrast due to stray light rays. The preferred embodiment is the ribs with a circular shape due to the ease of creating circular grooves.

14 Claims, 19 Drawing Sheets

U.S. PATENT DOCUMENTS

| | | |
|---|---|---|
| 5,506,629 A | 4/1996 | Kawahara et al. |
| 5,537,167 A | 7/1996 | Toide et al. |
| 5,652,680 A | 7/1997 | Kashihara et al. |
| 5,834,143 A * | 11/1998 | Matsuoka et al. ............. 430/5 |
| 5,892,627 A | 4/1999 | Duggan |
| 6,093,998 A | 7/2000 | Takezawa |
| 6,104,554 A | 8/2000 | Bodurek, Jr. et al. |
| 6,115,082 A | 9/2000 | Rudolph |
| 6,130,497 A * | 10/2000 | Takezawa et al. ............ 313/35 |
| 6,188,165 B1 | 2/2001 | Lee |
| 6,268,458 B1 | 7/2001 | Soane et al. |
| 6,304,378 B1 | 10/2001 | Clausen |
| 6,369,864 B1 | 4/2002 | Shinobu |
| 6,377,319 B1 | 4/2002 | Shinobu |
| 6,407,859 B1 | 6/2002 | Hennen et al. |
| 6,441,976 B1 | 8/2002 | Okorocha |
| 6,456,341 B1 | 9/2002 | Jung |
| 2002/0008918 A1 | 1/2002 | Hirata et al. |
| 2002/0024639 A1 | 2/2002 | Jung |
| 2002/0054246 A1 | 5/2002 | Hong et al. |
| 2002/0076181 A1 | 6/2002 | Veligdan |
| 2002/0080484 A1 | 6/2002 | Moshrefzadeh |
| 2002/0140332 A1 | 10/2002 | Florek |
| 2002/0171929 A1 | 11/2002 | Kim et al. |

* cited by examiner

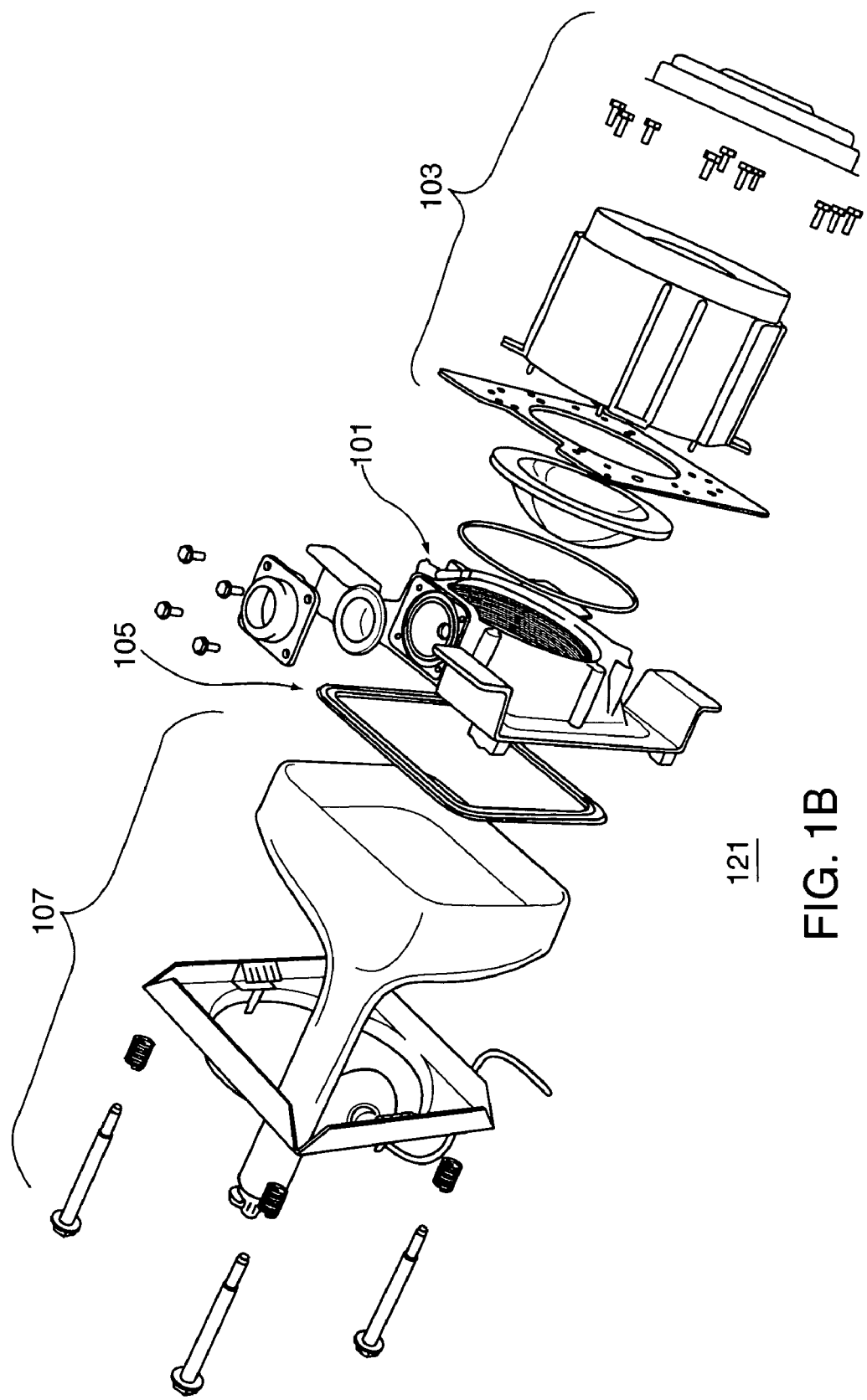

1401

PROJECTION COUPLER WITH CONTRAST RIBS

RELATED APPLICATIONS

This application claims the benefit of U.S. provisional patent application Ser. No. 60/415,030 filed on Oct. 1, 2002, assigned to Hitachi Electronic Devices (USA), Inc. (which is hereby incorporated by reference). This patent application is related to the U.S. patent application entitled Projection Coupler with Bubble Trap, assigned to Hitachi Electronic Devices (USA), Inc., filed on Sep. 5, 2003 and the U.S. patent application entitled Projection Coupler with Dual Channel Sealing Mechanism, assigned to Hitachi Electronic Devices (USA), Inc., filed on Sep. 5, 2003.

FIELD OF THE INVENTION

This invention relates to projection televisions and displays and, in particular, to an improved coupler for use in optically coupling a projection lens system of such a television or display to a cathode ray tube ("CRT") or other projection image source.

BACKGROUND OF THE INVENTION

Projection systems are widely used today for home and business applications. One common example is the large screen projection television. Projection televisions allow for the viewing of an enlarged image by typically using one or more CRTs to produce red, green and blue color images that are transmitted through a projection lens system and superimposed on a viewing screen to display a full color picture. A typical projection lens system is located at the back of the television and projected on the back of the display screen, although there are also forward facing projection systems used for large screens.

The projection lens system is coupled to the CRT by using a projection coupler. The coupler is typically filled with a liquid that enhances the contrast of the picture and performs an important cooling function to dissipate the heat generated by each of the CRTs. An example of the coupler liquid commonly used today is a mixture of ethylene glycol and glycerin. The coupler is necessary in projection systems to cool the CRT lens face. An overheated CRT lens can lead to component failure and causes reduced contrast by distortion of the picture signal in the elevated temperature condition.

Past designs of couplers can cause a reduction of the contrast of the overall picture because of reflections of portions of the picture signals caused by the coupler inside walls. Projection couplers are typically made from a metallic substance and have smooth and shiny surfaces. Projection couplers are typically made from a metallic substance and have smooth and shiny surfaces. Projection coupler manufacturers have attempted to address the lower contrast caused by the reflections in the coupler by using different approaches. One such approach is coating the inner surface of the coupler contacting the fluid in the cooling chamber with a non-retlective substance. Conventional techniques include e-coat deposition that dips the coupler in a non-reflective substance. Another technique that is used is called anodizing. Anodizing dips the coupler in a chemical solution and applies electricity to the coupler that causes controlled corrosion that dulls the surface of the coupler. A third technique is stippling which causes small bumps to be created in the coupler wall. Stippling is caused by sand blasting the coupler or using particle bombardment. All these techniques cause increased manufacturing costs, and although they do help reduce the reflections of the picture signal caused by the coupler wall, they do not eliminate the problem. A cost effective additional technique is needed to reduce the extraneous projection optical signal reflections that reduce contrast.

The existence of the cooling liquid in the coupler formed cooling chamber can cause major damage to the projection system if it leaks into the system or surrounding devices. The coupler must also be stationary after it has been attached to the CRT faceplate to ensure proper alignment of the projection system. The coupler is typically attached to the CRT faceplate by a simple O-ring placed in a groove in the components to ensure a proper seal between the components. The O-ring placement between the coupler and CRT faceplate in the assembly process is typically performed by human workers. Sometimes the O-rings can turn slightly when being put in place thus creating a faulty seal that is difficult to detect. An improved seal design is needed in order to create a redundant seal so that if one of the seals is defective or is broken by sudden jarring, the second seal will remain in place. The improved seal design needs to be made with a minimum of manufacturing costs.

Small bubbles in the coolant in the coupler liquid chamber can be created either at the time of manufacture when the coupler is filled with the coolant or during the life of the product. The coupler will typically have an expansion chamber located outside the cooling chamber that allows the liquid to expand into the expansion chamber as the temperature of the liquid rises due to the heating of the CRT. The fill hole used to fill the cooling chamber formed by the coupler frame can also be in the expansion chamber. The continuous filling and receding of the liquid in the expansion chamber can cause air bubbles to be created. The air bubbles can act as tiny reflecting mirrors that can cause stray light signals that travel through the hole into the expansion chamber to be transmitted back into the cooling chamber containing the picture signal thus reducing contrast. The problem of the presence of these reflecting bubbles has not been previously addressed in other known designs. An improved coupler design is needed that will not dramatically increase manufacturing costs to solve the problems discussed above.

SUMMARY OF THE INVENTION

The present invention is directed to a coupler with contrast ribs for use in a projection system. The coupler supports a projection lens in alignment with a projection optical signal generation device (e.g., a Cathode Ray Tube). The contrast ribs minimize contrast distortion that occurs in the coupler. The coupler defines a cooling chamber between said projection lens and said projection signal generating device and is filled with liquid in order to transport the optical signal between the projection optical signal generation device and projection lens. The contrast ribs change the angle of reflection of stray light rays generated by the projection optical signal generation device and direct a portion of those stray light rays to other contrast ribs. The ribs are preferably coated with a chemical composition that helps allow the ribs to absorb a portion of each ray incident on the rib. Thus each time the stray light ray strikes a rib, a portion of it is absorbed and not reflected back thus minimizing any reductions of the overall picture contrast due to stray light rays. The preferred embodiment is the ribs with a circular shape due to the ease of creating circular grooves.

The contrast ribs are preferably round in dimension but can also be rectangular or triangular. The contrast ribs preferable cover at least 75% of the surface area of the inside wall of the coupler (which coverage includes the portion extending out from the surface wall as well as the adjacent troughs between ribs). The contrast ribs can be manufactured by creating grooves in the inside surface of the coupler wall by tooling after the coupler has been formed or as part of the coupler frame's casting process.

BRIEF DESCRIPTION OF THE DRAWINGS

The objects, features and advantages of the present invention will become more apparent from the consideration of the following detailed description, taken in conjunction with the accompanying drawings, in which:

FIG. 1B shows an exploded view of the projector system of the present invention;

DETAILED DESCRIPTION OF THE INVENTION

The present invention is directed towards an improved coupler that is used to connect a projection lens to a projection optical signal-generating device (e.g., a cathode ray tube ("CRT")). The improved design allows for minimum manufacturing changes while addressing a number of problems in previous coupler designs. The improved coupler includes grooves formed in the inner wall of the coupler frames that form contrast ribs. The contrast ribs reduce stray light rays from the CRT that reflect off the coupler frame inner wall. The stray light rays reduce overall contrast of the picture that is projected onto the screen by the projection system. The improved system also includes two redundant sealing grooves in the coupler frame that receive an integral redundant gland gasket that protects the projection assembly against leaks of the fluid contained in the coupler. The presence of two glands forming two independent seals ensures that the liquid contained in the coupler after assembly will not leak out. Leaks of the liquid can cause picture distortion as well as harm to the components in the projection assembly. Finally, the improved coupler includes a bubble chamber that is designed to keep bubbles in the cooling liquid away from the inside cooling chamber where the picture signals are passed from the CRT to the first lens assembly. In the prior art couplers, stray light can pass through the hole to the bubble chamber and reflect back off the bubbles into the inside chamber thus reducing overall contrast of the picture signal. The bubble chamber can also serve as the place for filling the cooling chamber and allowing expansion of the liquid when it is heated. These improvements are further described below.

Figure 1A:
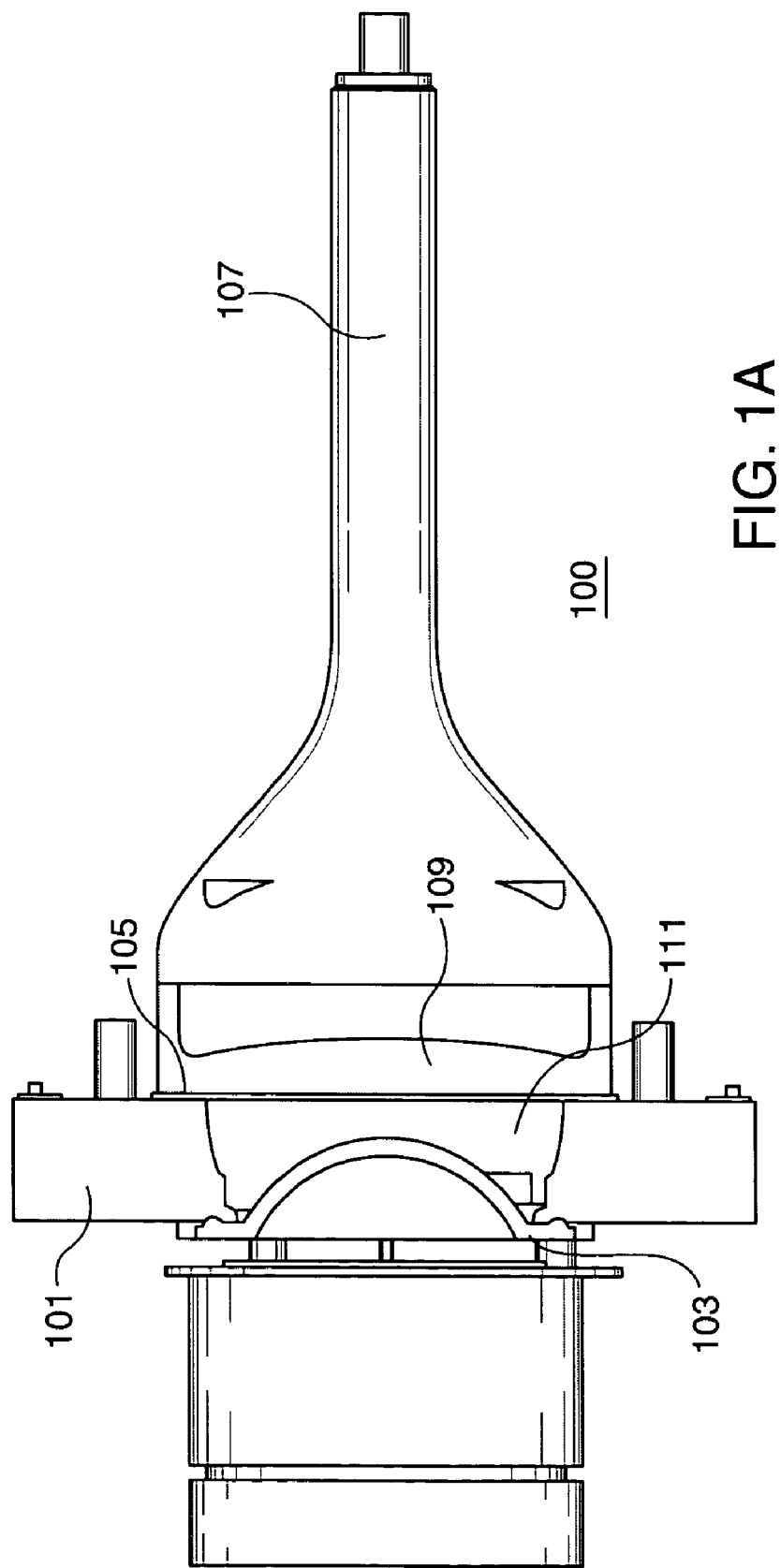
FIG. 1A shows an illustration of the projector system of the present invention including the projection coupler situated in between the projection lens and the projection optical signal generation device (e.g., CRT)

FIG. 1A shows an illustration of the optical projection system 100 including a coupler 101, a first lens assembly 103, a gasket 105 and a projection optical signal-generating device 107 (a CRT as shown). Additional lens assemblies can be added to the system as required. The coupler 101 is axially aligned between the CRT 107 and first lens assembly 103. The coupler 101 physically abuts the first lens assembly 103 and CRT faceplate 109 to form a coolant chamber 111 that will be filled with coolant liquid during the assembly process. The coolant liquid will cool the components as their temperature is elevated by the CRT 107 when operating. It additionally enhances the contrast of the picture due to refraction attributes of the chemical composition of the coolant liquid. FIG. 1A also shows the integral redundant gland gasket 105 that secures the coupler to the CRT faceplate 109. The contrast ribs on the inside surface of the coupler 101 and bubble trap are shown in more detail in other figures and described below. The three embodiments of the improved coupler are also described in more detail below.

FIG. 1B shows an additional exploded view 121 of the optical projection system of FIG. 1A. The system includes the coupler 101, the first lens assembly 103, a gasket 105 and a projection optical signal-generating device 107. The screws for holding the system in place are also shown.

I. Coupler Contrast Ribs

Figure 2:
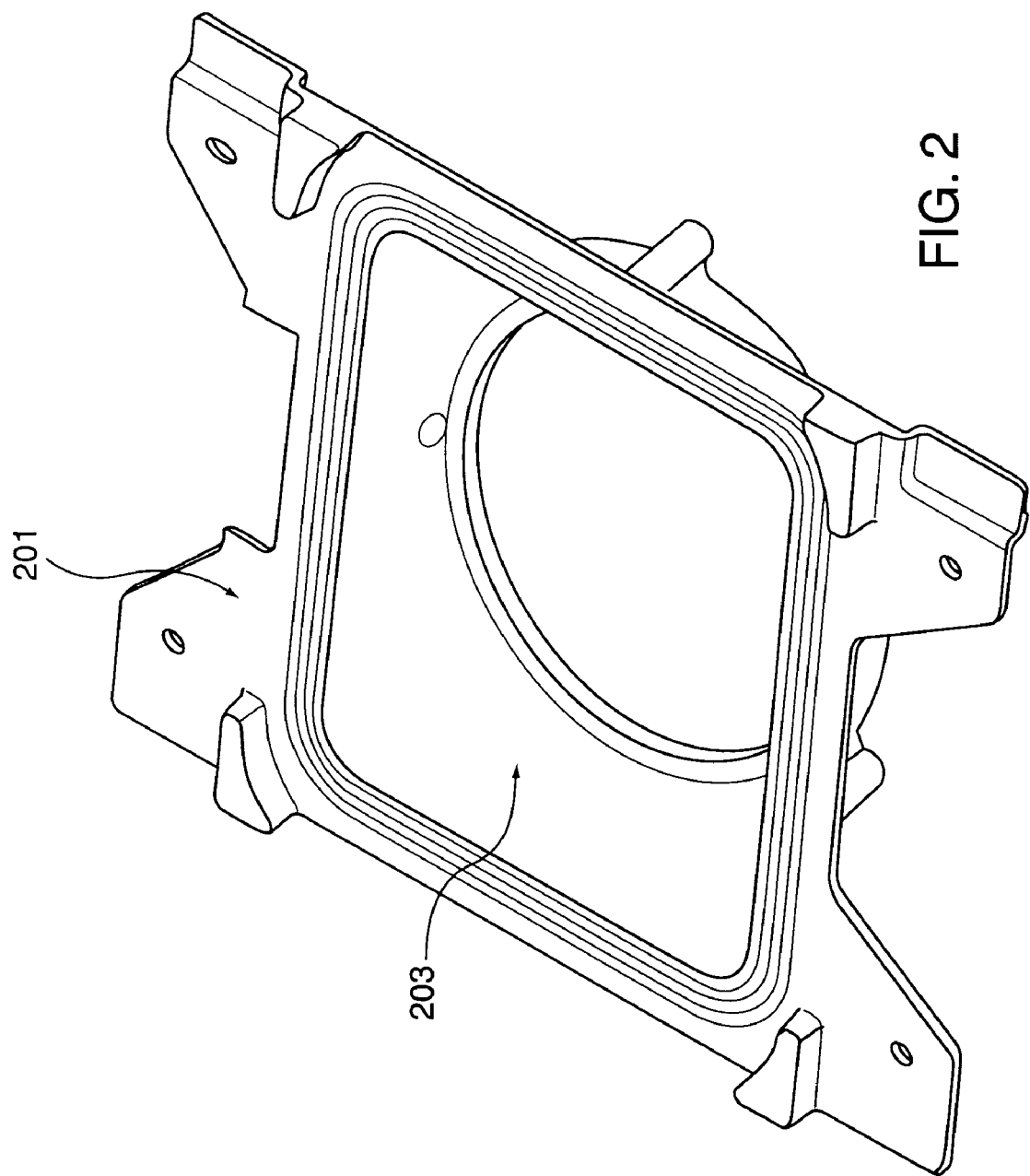
FIG. 2 shows an illustration of an optical projection system coupler without the contrast ribs.

FIG. 2 is an illustration of an optical projection coupler without contrast ribs. The shown coupler 201 includes the coupler frame with inside smooth surfaces 203 that are used in prior art couplers. After the coupler frame side shown in FIG. 2 is physically attached to the CRT and the opposite coupler side (not shown) is physically attached to lens assembly, the resultant chamber will then be filled with a coolant liquid. The optical signal from the CRT will pass through the liquid in the coupler coolant chamber and then into the first lens assembly. The inner surface 203 of the coupler frame shown is smooth resulting in stray light rays from the CRT reflecting off the frame surface and causing a reduction in contrast of the resultant picture.

Figure 3:
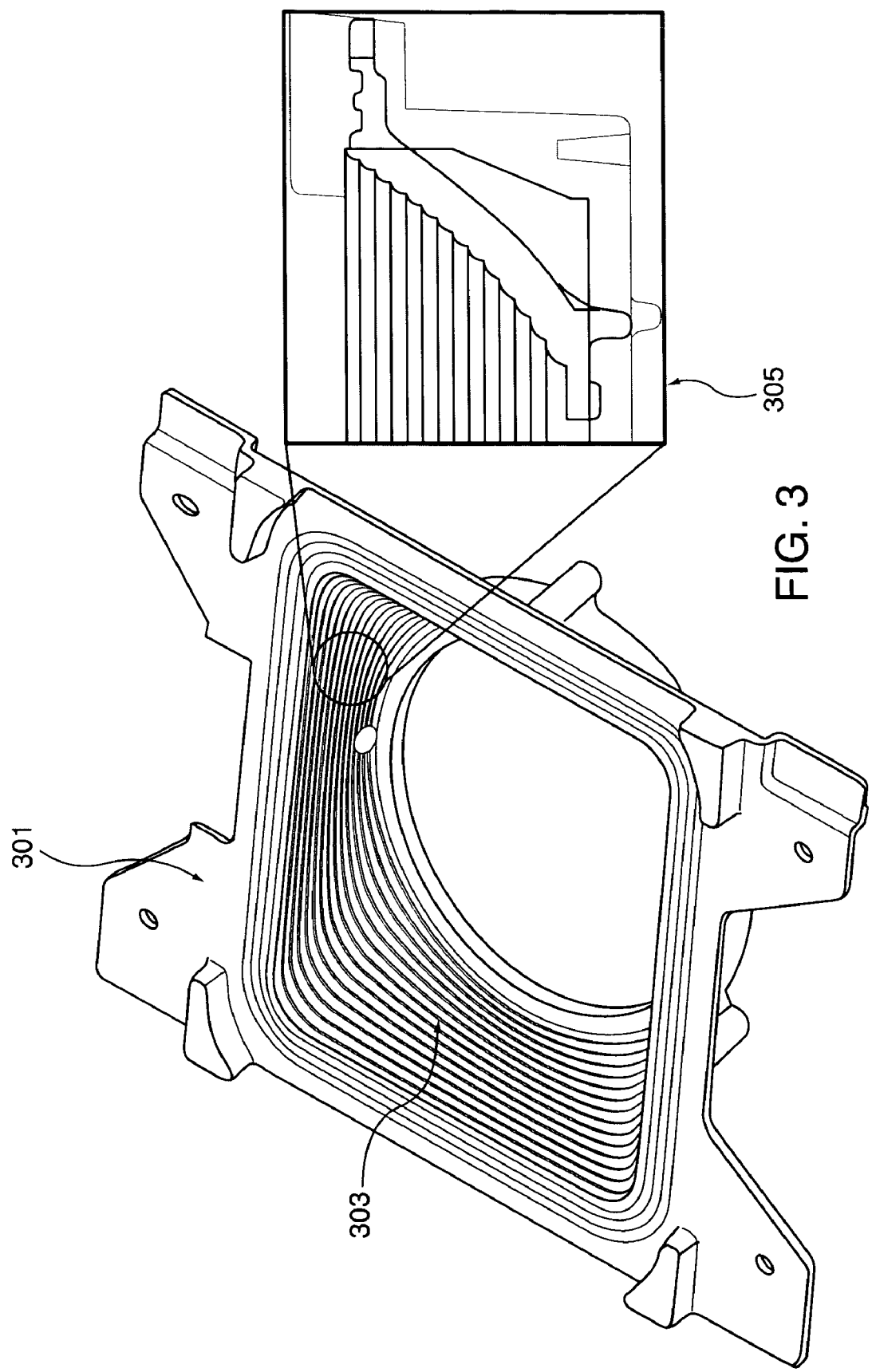
FIG. 3 shows an illustration of an optical projection system coupler with the contrast ribs.

FIG. 3 shows an example of an optical projection system coupler 301 including the contrast ribs 303 of the present invention. The contrast ribs 303 shown in FIG. 3 are created by forming grooves in the coupler frame's inner surface. The figure also shows an enlarged internal cross-section drawing 305 of the contrast ribs 303. The coupler 301 can be made from different materials. In the preferred embodiment, an aluminum alloy is used as the coupler material. Aluminum alloys (e.g., industry known "360" alloy) are inexpensive, have favorable thermal characteristics and work well in the casting manufacturing process. The contrast ribs 303 are preferably made during the die cast operation when the coupler 301 is formed because grooves can be inexpensively added to the die cast molds. However, the grooves can also be added after the coupler 301 has been cast by a machining or etching process.

The contrast ribs 303 reduce the internal reflections caused by the smooth and shiny surfaces of the coupler frame 101 when the optical light signal passes from the CRT 107 through the coupler coolant chamber and into the projection lens 103. The internal reflections cause reduced contrast. The inclusion of coupler ribs 303 also provides greater contrast uniformity from coupler to coupler due to the coupler frame itself.

The contrast ribs 303 can be formed by tooling or scribing various types of grooves on the inner surface of a projection TV coupler frame, optimized by shape, height, and width to minimize the reflections of skew rays into the projection lens. These ribs 303 can be coated or anodized for additional absorption of stray light. The contrast ribs 303 are preferably cut horizontally into the sides of the coupler's 301 internal wall as shown in FIG. 3 but could be configured in any direction found to improve the light reflections. In the preferred embodiment shown in FIG. 3, the contrast ribs 303 are extended into a substantially parallel plane to the coupler's openings.

FIG. 3 shows illustrations of contrast ribs 303 that can be molded or machined into the inside surface of a coupler. The contrast ribs 303 are preferably 0.5–2 mm in height and or width. The preferred size for the best performance is 2 mm both in height and width so that any coating on the surface will not fill in between the formed ribs but a maximum number of skew rays will be reduced; however, the ribs can be different sizes. They can be rounded, triangular, or rectangular in shape but are preferably inserted extending substantially parallel to the plane of the coupler openings and parallel to the mounting plane of the lens 103 and CRT faceplate 109. The ribs are preferably coated with a chemical composition that helps allow the ribs to absorb a portion of each ray incident on the rib. When stray light hits the sides of the coupler wall, the contrast ribs will absorb a portion of the stray light and then reflect the light to other internal contrast ribs to again be absorbed. The redirection of unwanted light and the continual absorption of the stray light reduces the amount of stray light passed through to the lens 103 thus improving the overall low light contrast in the projected picture. The presence of the contrast ribs 303 also increases the repeatability of contrasts in the finished projection coupler 301 by decreasing the variations in the prior art couplers due to patches of reduced coating on the prior art smooth coupler frame or other differences in the reflection properties of areas of the inside walls of the prior art smooth coupler frame. The contrast ribs 303 preferably cover at least seventy-five (75%) percent of the surface area of the inside walls of the coupler. Some portion of the inner walls may not have contrast ribs due to manufacturing conditions such as the need to hold the coupler in place during the manufacturing operation.

Figure 4:
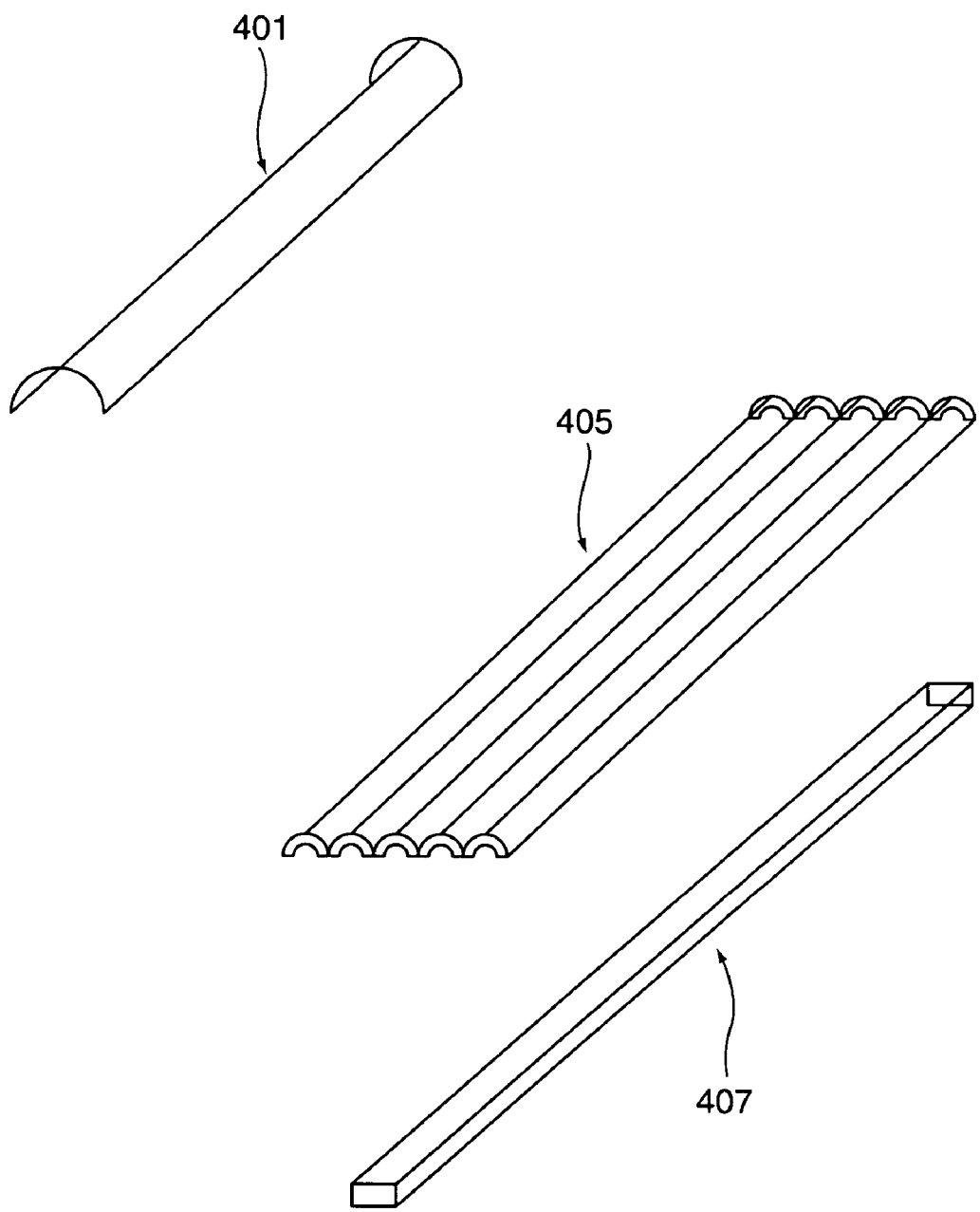
FIG. 4 shows an illustration of contrast rib examples that can be used on the coupler frame inner surface.

FIG. 4 illustrates examples of the shape of contrast ribs 303 that can be formed in the coupler frame's inner surface. Rib Type 401 shows a circular configuration of an individual contrast ribs 303. Ribs 405 show a plurality of circular ribs formed together in the coupler's inner surface wall. Rib Type 407 shows a rectangular configuration of an individual contrast rib 303. Triangular shapes can also be used. These ribs will change the angle of reflection of stray light rays and direct a portion of those light rays to other contrast ribs. The preferred embodiment is the ribs with a circular shape 401 due to the ease of creating circular grooves. The ribs are preferably coated with a chemical composition that helps allow the ribs to absorb a portion of each ray incident on the rib. Thus each time the stray light ray strikes a rib, a portion of it is absorbed and not reflected back thus minimizing any reductions of the overall picture contrast due to stray light rays.

Figure 5:
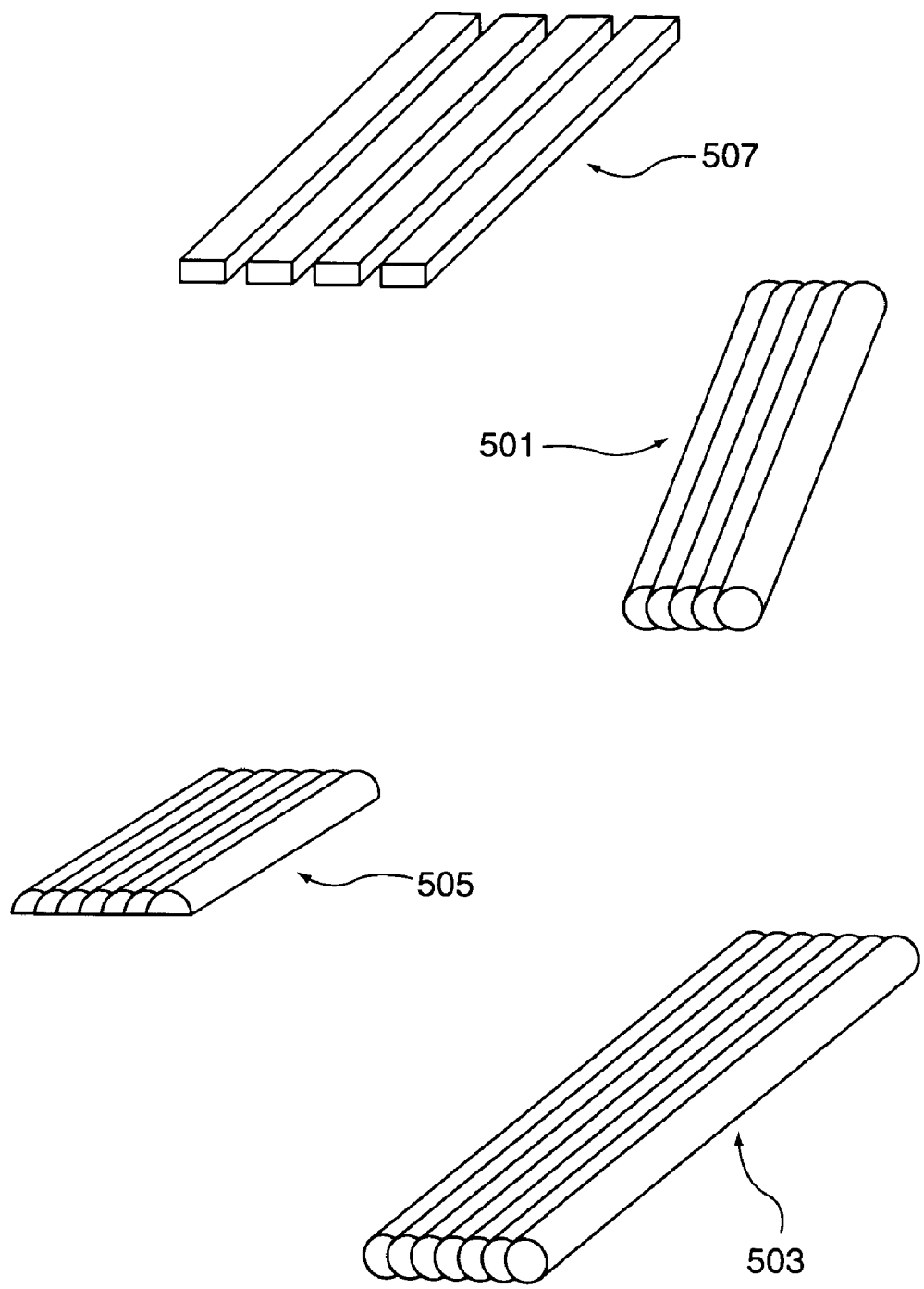
FIG. 5 shows a further three dimensional illustration examples of contrast rib that can be used on the coupler inner surface.

FIG. 5 is three-dimensional representation of the examples of contrast ribs shown in FIG. 4. The ribs can be formed in the frame's inner surfaces by casting, machining or etching grooves in the surface during the manufacturing process. Examples include circular ribs 501, 503 and 505. Also shown are square ribs 507. The resulting grooves in the preferred embodiment are in the shape 505 shown in FIG. 5.

Figure 6:
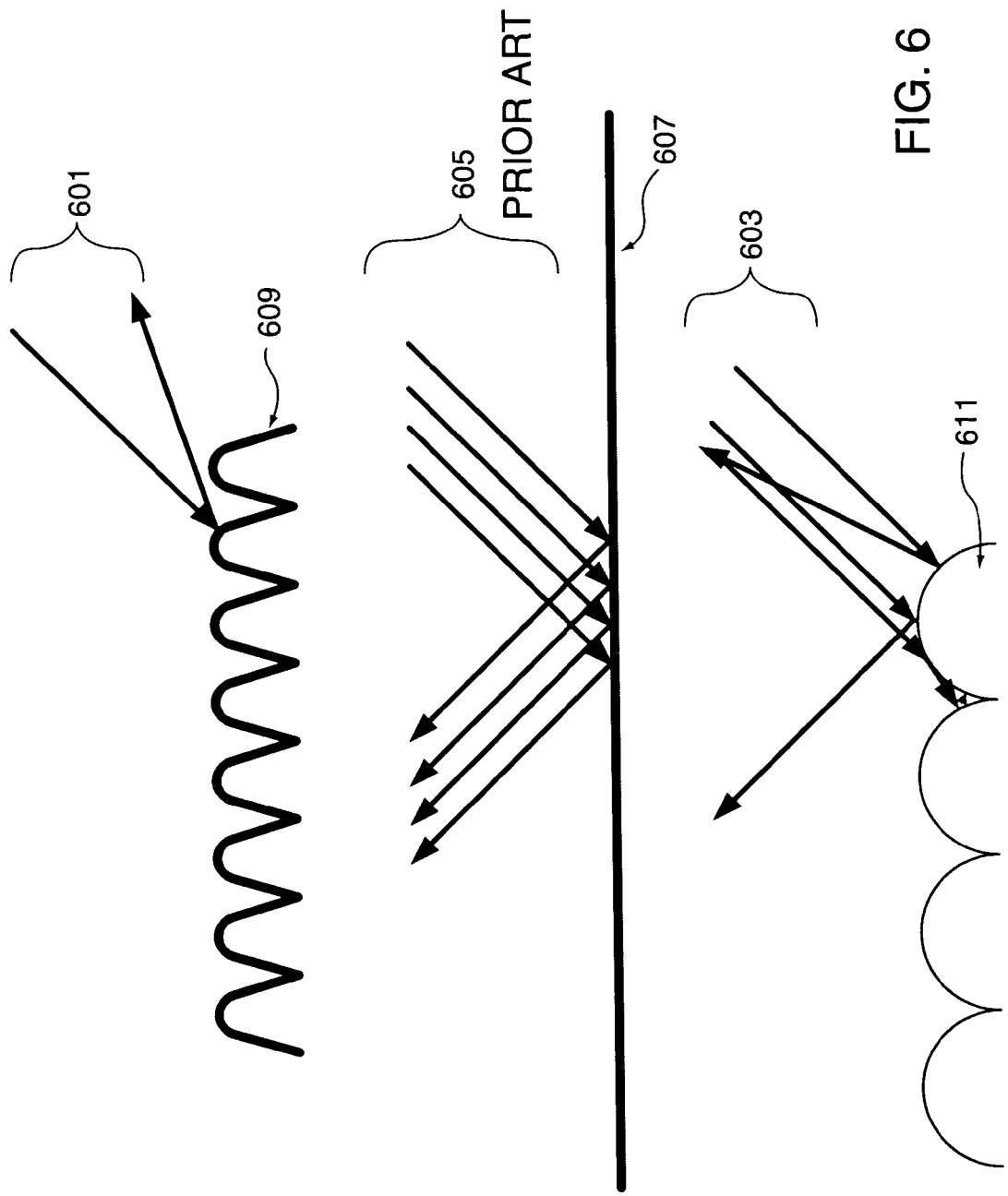
FIG. 6 shows illustrative examples of incident light from the projection optical signal generating device hitting a ribbed surface verses a flat surface of the prior art.

FIG. 6 shows examples 601 and 603 of the effect of stray light rays contacting the ribbed surface of the present invention. Example 605 shows the prior art example of contacting a flat surface without ribs. In the flat surface 607, the incident light rays will reflect at an angle related to the angle of contact determined by the direction of the CRT optical projection signal. Thus the stray light will be transmitted forward into the projection lens assembly. In the ribbed surface 609 and 611, the light rays will be reflected at an angle related to the particular portion of the rib it contacts. Thus the light will be dispersed and reflected back onto other rib surfaces. As a portion of the stray light is absorbed each time it hits a rib coated with a light absorbing substance, the amount of stray light is reduced and overall picture contrast is increased.

The contrast ribs 303 can be used in any liquid coupling system designed for projection systems including, but not limited to, CRT projection systems, Liquid Crystal Displays ("LCD"), Digital Modular Devices ("DMD"), and other light valve coupler systems. It may also be used in air coupling systems where liquid is not used to fill the chamber.

II. Coupler Redundant Sealing System

The coupler redundant sealing system improves the seal integrity of a liquid coupled optical projection system 100 by creating redundancy into the seal and gasket 105 groove design of the light box coupler 101. This seal redundancy system is designed to work as a "fail-safe" mechanism or backup in case of dynamic shock during handling or transportation or assembly defect. This system improves on prior art single or double lobe O-rings or gasket coupled systems by using a dual seal groove coupler and a unique one piece, double gland, quad lobe design gasket.

Previous prior art gaskets include a standard single gland groove cast or machined into the CRT side of the coupler. Due to coupler surface finishes, which are needed for contrast improvements for the projection system, a standard single gland groove coupler has no redundancy or backup in case of seal failure, other than the seal design itself. Surface finishes, such as e-coatings and textured paint, create unfavorable sealing conditions that can result in reduced seal life, premature wear, leakage, and/or seal failure. The integral redundant gasket system with a dual groove coupler design of the present invention will improve seal integrity by allowing the outer seal gland groove to function as a backup to the inner seal gland groove.

Figure 7:
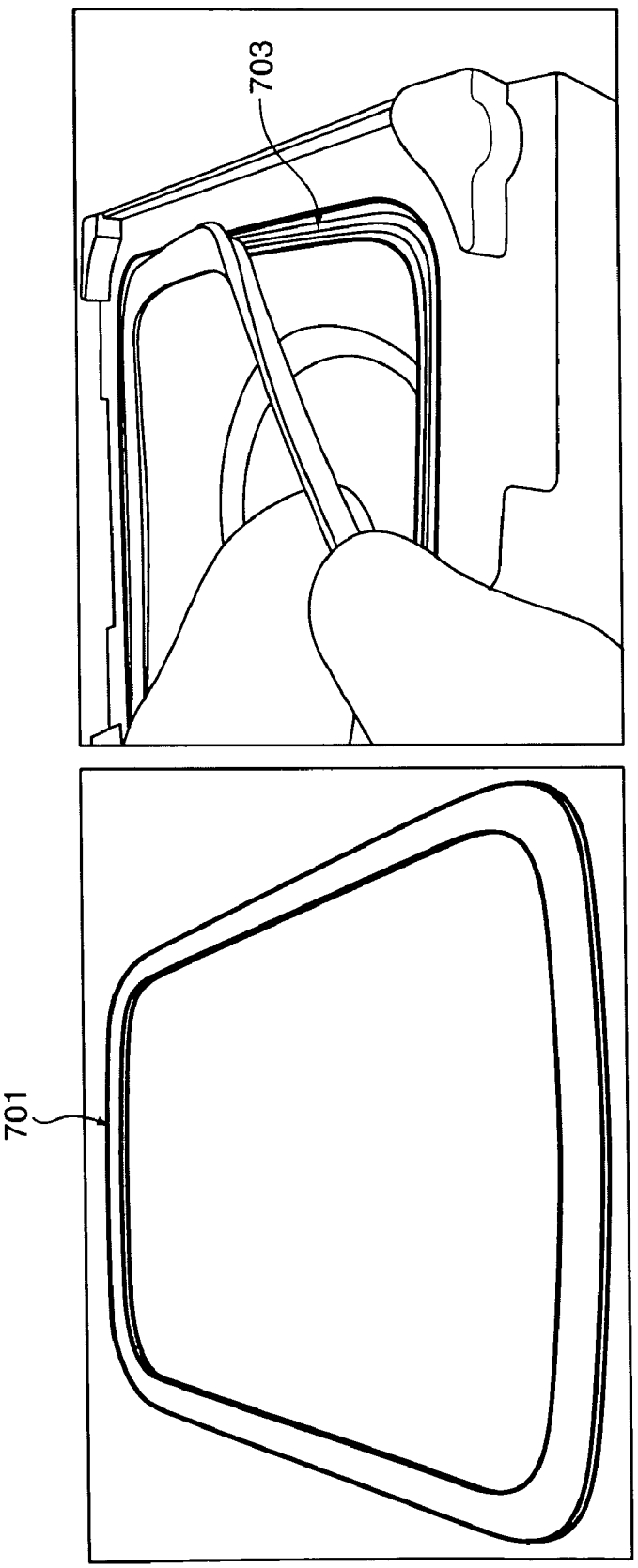
FIG. 7 shows an example of a prior art single gland gasket.

FIG. 7 shows an example of a prior art O-ring gasket 701 that has been used in projection systems to seal the coupler to the CRT. The O-ring is placed into a single gland groove 703 in the coupler frame in order to form a liquid seal between the components it is in contact with. This type of single seal can be broken for example by having structural defects, jarring of the projection product or assembly errors.

Figure 8:
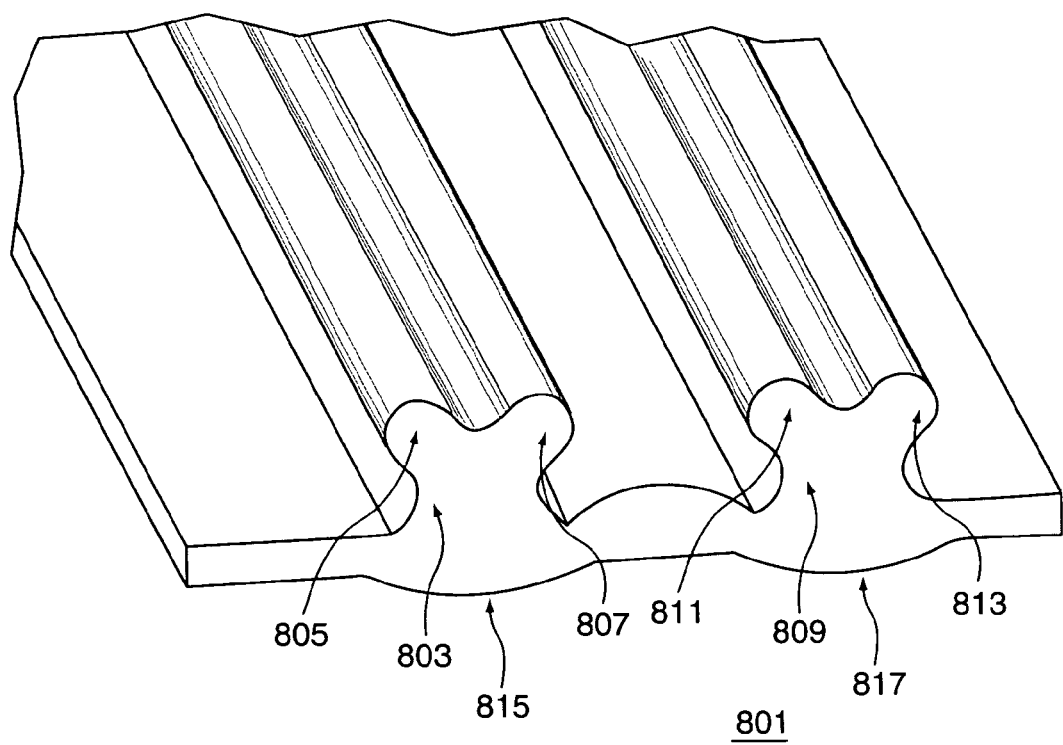
FIG. 8 shows as example of a cross-section of an integral redundant gasket.

FIG. 8 shows a cross-section of a portion of the integral redundant dual gland gasket of the present invention. The gasket 801 includes a first gland 803 with lobe 805 and lobe 807. The gasket 801 also includes a second gland 809 with lobe 811 and lobe 813. Each gland with dual lobes is placed in a corresponding groove in the coupler thus creating two separate lines of seal that keeps the liquid in the coupler from leaking out. The integral redundant dual gland system also prevents air from leaking into the sealed liquid chamber that also prevents contrast distortion.

The integral redundant gasket system of FIG. 8 utilizes standard O-ring type lobes 815 and 817 on the CRT side of the gasket (although other designs can be used as the dual lobe design). For example, the integral redundant dual gland design could also be used for the seal between the coupler and CRT.

Figure 9:
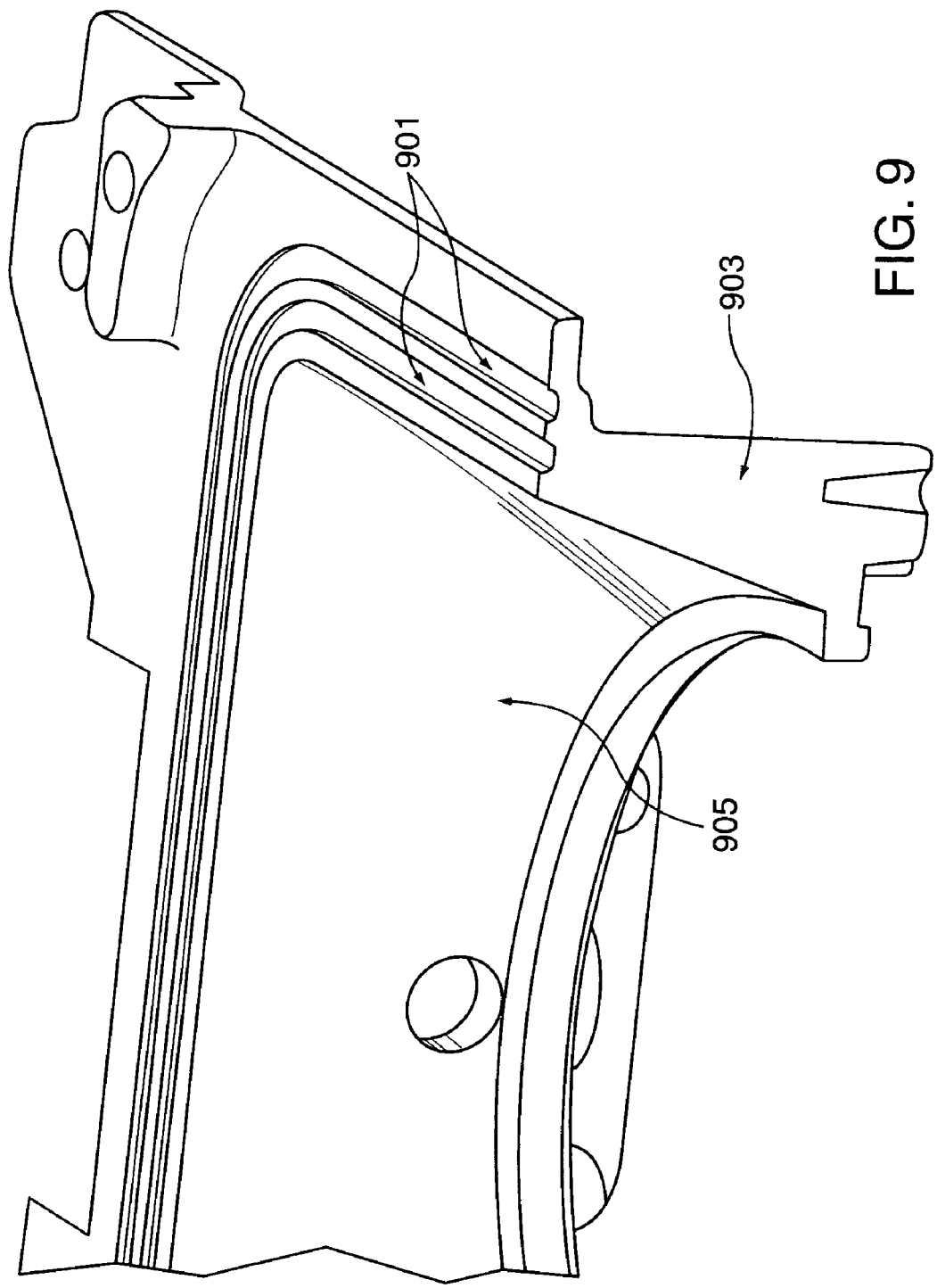
FIG. 9 shows a cross section of the coupler with grooves for use with an integral redundant gland gasket.

FIG. 9 shows an illustration of a cross-section of the dual gland grooves 901 that are formed in the coupler frame 903 in accordance with the present invention. One groove is formed inside the other so that each gland will be placed in one of the grooves. In the present invention, the grooves made in the coupler frame can accommodate the double lobe design. The grooves can be formed by casting, machining or etching the grooves in the surface of the frame walls during the manufacturing process. The preferred manner is to form the grooves in the die cast for the coupler that can be done inexpensively. Also shown in FIG. 9 are the inner wall surfaces 905 of the coupler frame, which will form part of the coolant liquid chamber. Inner wall 905 may also contain contrast ribs (not shown).

Figure 10:
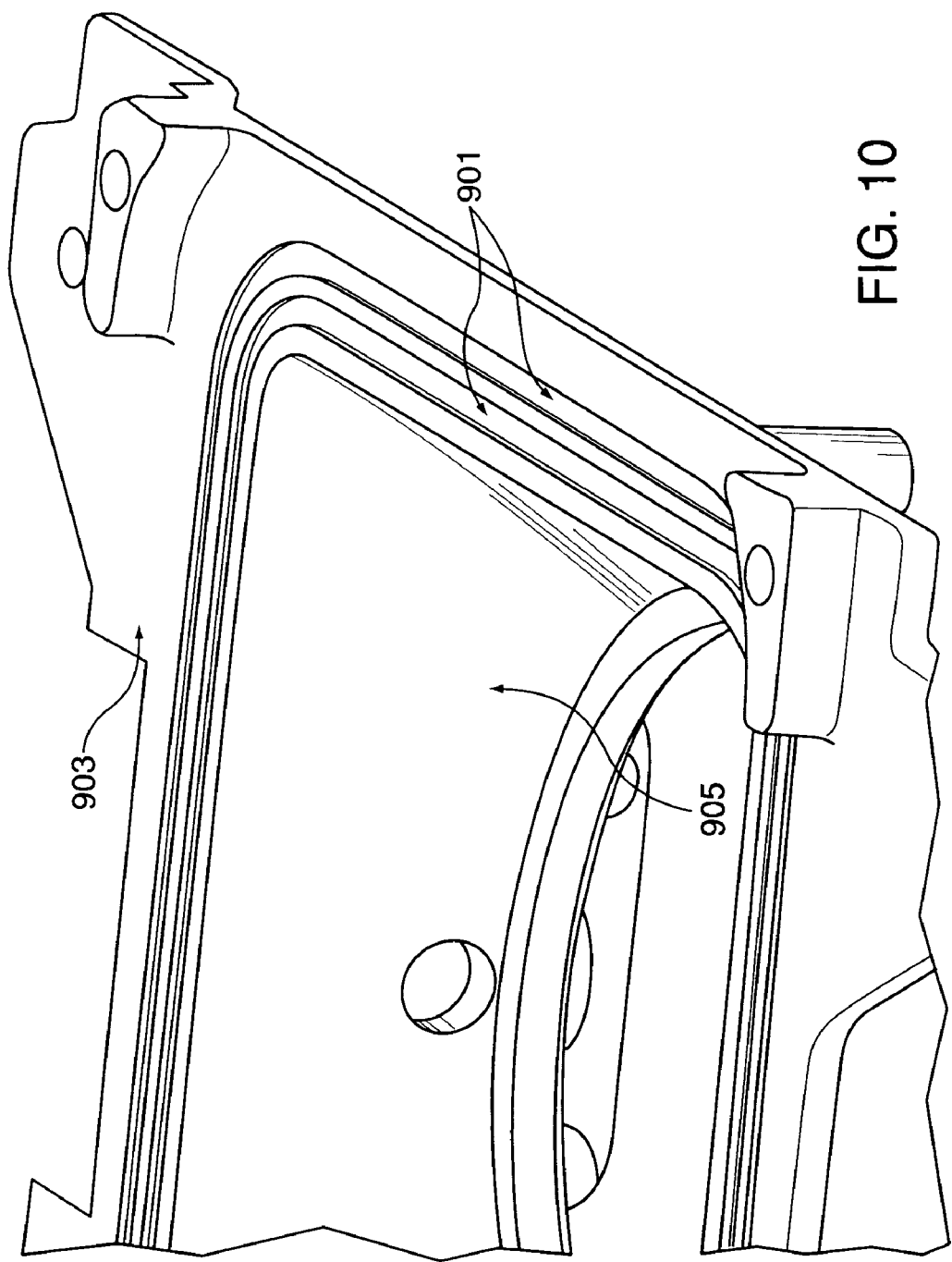
FIG. 10 shows an additional view of the coupler with grooves for use with an integral redundant gland gasket.

FIG. 10 is a top view of the coupler frame 903 with dual gland grooves 901 shown in FIG. 9. The inner wall 905 of the coupler is also shown.

Figure 11:
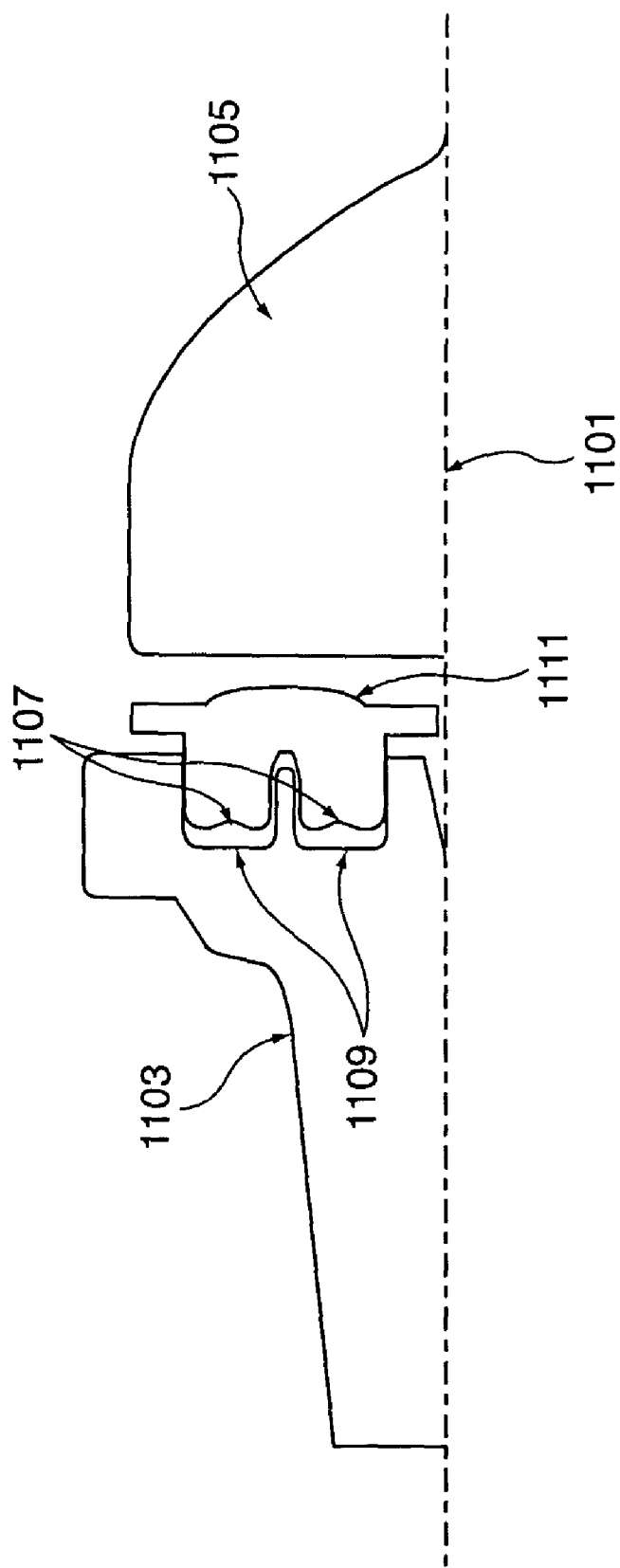
FIG. 11 shows an example of the cross section of the integral redundant gasketing installed in the coupler system (not drawn to scale)

The dual groove sealing system shown in FIGS. 9 and 10 are die-cast or machined into the mating-surface of the light box coupler. The grooves shown can be of any shape, width or depth to accommodate multiple lobe seals. The coupler seal groove walls 901 may be straight, chamfered or beveled to improved overall seal integrity. The grooves preferably run parallel with the inner edge of the coolant chamber walls. The one piece, double gland, quad lobe design gasket normally follows the same pattern and basic shape of the coupler grooves. FIG. 11 illustrates how these parts, once mated as an assembly, would create the redundant gland gasket system for an optical projection device. Seal integrity plays an important roll in optical projection systems; thus, seal failure eventually results in a complete projection system breakdown. The light box liquid coolant in the optical projection system acts as a liquid optical coupler. This aids in coupling the light from the CRT face glass to the face of the "C-Element" or first projection lens. Using air instead of liquid would generally give too much refraction at the glass-air interfaces. The liquid also acts as a thermal transfer fluid to evenly distribute and conduct heat away from the CRT face to prevent premature weakening or cracking of the glass. Coolant leakage can also be caused by poor sealing surfaces such as textured coatings or paint used to seal the aluminum coupler castings. The redundant gasket system improves seal integrity; thus, preventing coolant contamination by bacteria or foreign particles, aids in extending tube life, improves sealing conditions on textured or rough coupler surfaces, and helps prevents total system failure of optical projection device.

FIG. 11 shows an illustration (not to scale) of the integral redundant gland gasket 1101 placed between the coupler frame 1103 and the CRT tube (or other light generating device 1105). The redundant double glands 1107 are placed in each of two dual gland grooves 1109 formed in the coupler. The gasket side 1111 used for contacting with the CRT faceplate can be formed with a single O-ring type seal as shown in the FIG. 11. Alternatively, a redundant gland and/or lobe system can also be used for the seal with CRT faceplate. However, it is more difficult to form additional gasket receiving grooves in the CRT faceplate than in the coupler frame.

Figure 12:
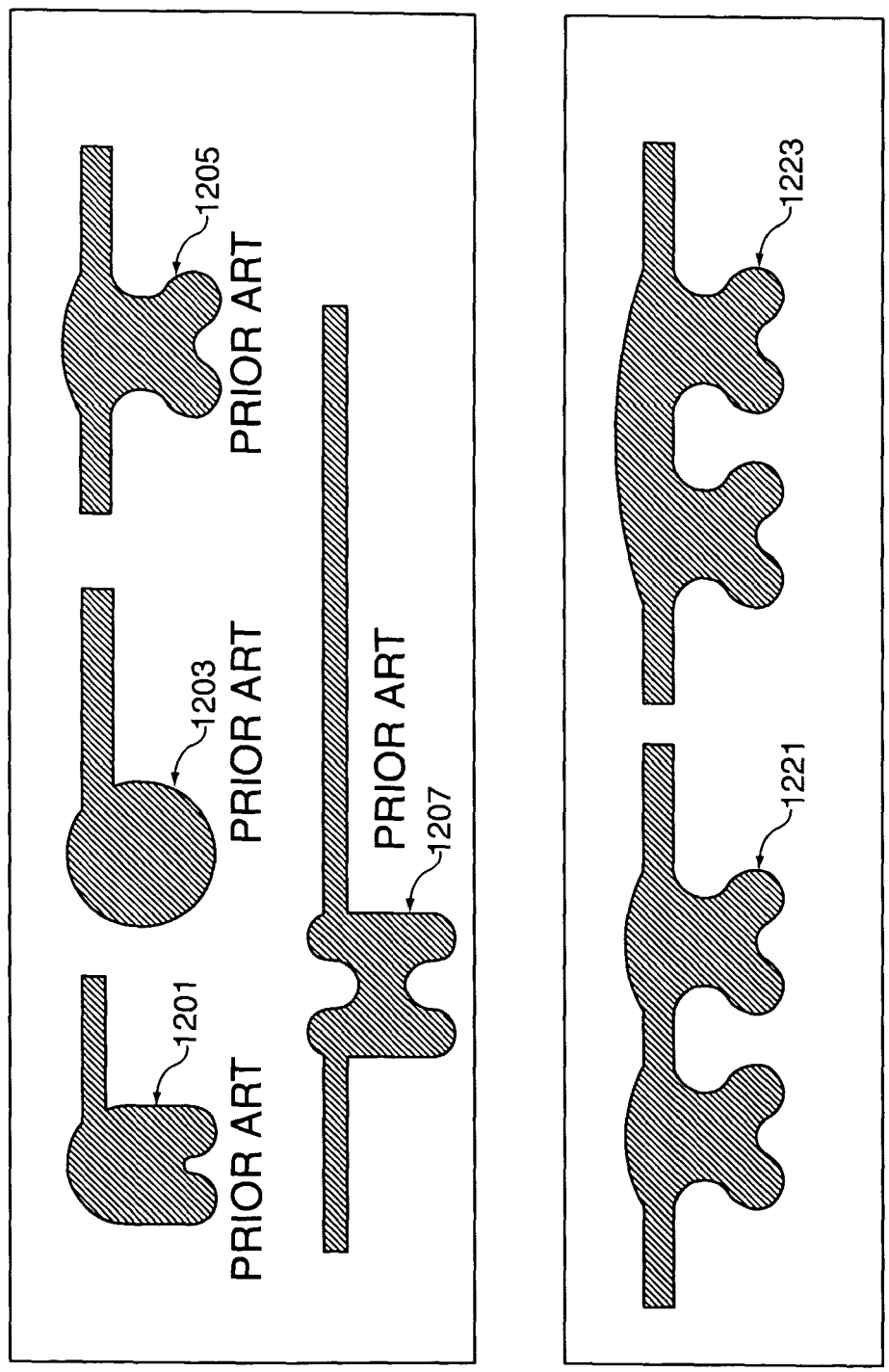
FIG. 12 shows examples of cross-sections of prior art gaskets and the integral redundant gaskets of the present invention for optical projection couplers.

FIG. 12 shows an illustration of cross-sections of a prior art single gasket that may be used with a coupler (besides an O-ring in FIG. 7) and a cross-section of the integral redundant gasketing system of the present invention for optical projection couplers. Prior Art Type A 1201 shows a U-shaped single gland gasket. Prior Art Type B 1203 shows a circular type single gland gasket. Prior Art Type C 1205 shows an X-shaped double lobe single gland gasket. Prior Art Type D 1207 shows a H-shape type gasket. Also shown in FIG. 12 are examples of the redundant integral gaskets used in the present invention. Each gland may contain alternative lobe designs as shown in the single gland prior art examples. The gasket type 1221 shows a redundant gland double lobe gasket. The two double lobes ensure that if one of the double lobes fails or leaks, the other double lobe will keep the seal between the coupler and the CRT in tact and contain the liquid in the coupler cooling chamber. The double lobe design of each gasket gland further increases the ability to keep at least one complete seal in tact in the projection system. Gasket 1221 and gasket 1223 shows a curvature over each of the double lobes in the gasket. The gasket 1223 is similar to gasket 1221 except the curved portion of the gasket over the lopes are formed as a single curve. The curves are used to make the seal with the CRT faceplate. The curve also allows for strengthening of the gasket over the lobes that will be inserted into grooves formed in the coupler. The integral redundant double lobe gasket can be made from different materials. One preferred material is a silicon rubber such as "EPDN".

This integral redundant double lobe gasket can be used in any liquid optical coupling apparatus for projection systems including, but not limited to, CRT projection systems, Crystal on Silicon ("LcoS"), LCD, DMD, and other light valve/light engine coupler systems. This embodiment of the invention could be used as a quality or performance-enhancing feature for rear or front projection television systems.

III. Coupler Bubble Chamber

One common problem in liquid optical coupler systems is that in normal operation and production the coupler systems tend to get air bubbles trapped at the top of the system. The bubbles rise to the highest point possible in the liquid. These bubbles act like tiny mirrors and reflect light rays hitting them. The light rays are reflected back into the optical system and can cause lower contrast and reflections in the projected picture (the amount of distortion will depend upon scene content). The bubble trap could be incorporated in any optical coupler assembly where an object is to prevent air bubbles from contacting stray light.

Figure 13:
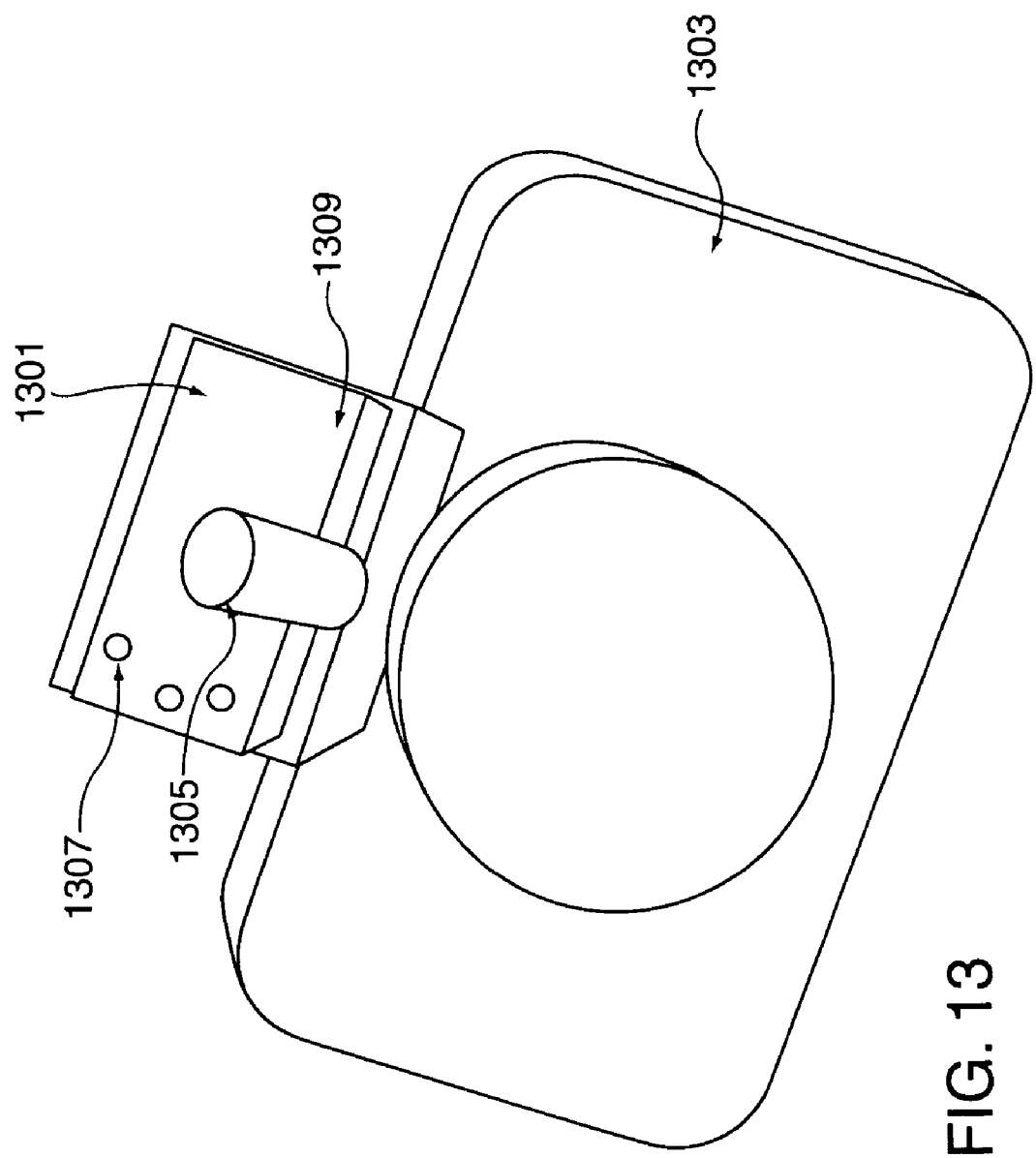
FIG. 13 shows an illustrative example of a cross-section of the structure and positioning of the bubble trap attached to coupler frame.

FIG. 13 shows an illustration of a cross-section bubble trap 1301 that is attached to the coupler frame 1303. The bubble trap is preferably positioned in the center of one of the coupler frame walls. A fill hole 1305 is made in the coupler frame wall so that the coolant chamber that is formed when the coupler system is assembled can be filled with the desired liquid. The connecting fill hole is 1305 made sufficiently small so that any stray light rays will not contact the bubbles 1307 that will collect on the elevated side of the bubble trap. A preferred size of the fill hole 1305 is ½ inch in diameter, which is smaller than the typical 1-inch diameter fill hole size for other prior art couplers. The outside dimensions of the bubble trap 1301 shown in the example is preferable rectangular in shape for ease of attachment. The inside chamber 1309 of the bubble trap may be rectangular, circular or oval, as long as the elevated outside region is outside of the possible stray light paths through the fill hole. The inside chamber 1309 of the bubble trap includes a flat shelf area positioned parallel to the plane of the fill hole 1305 and on top of the coupler. An example of a bubble trap dimension is a bubble trap chamber in a circular shape that has a flat shelf 28 mm wide that contains a fill hole that is 8.8 mm in diameter. The bubble trap in this example is preferably 11 mm deep. The ratio between the fill hole size and the bubble trap shelf dimension is key to making sure any bubbles are trapped outside the stray light rays' path. The preferred length ratio comparing the size of the chamber shelf diameter to the fill hole diameter 1305 for a standard projection television configuration is at least 3 to 1. However, a ratio of 2 to 1 will also assist in removing a portion of the bubbles from the stray light path.

In a conventional projection television system, the coupler system including the CRT, coupler and first lens assembly are tilted inside the television so that the picture is projected on the screen at an angle. This allows the depth dimension of the projection television to be minimized. When the coupler system is placed in a television set or other projection system, the air bubbles migrate to the top of the coupler, through the fill hole and into a corner position of the bubble trap. The shelf of the bubble trap then shields and traps the bubbles and prevents the stray light from directly being reflected from the bubbles. The "Bubble Trap" is a system design that corrects for bubbles that occur either in production or in the life of the product. The bubble trap is an optical blocking system that is responsive to the angle of the coupler frame in the projection product and puts a barricade between the stray light and the bubbles' resting place. The bubbles are still present but when the frame and connected bubble trap are tilted, the bubbles float to a corner in the bubble trap away from the fill hole and away from the possible direction of the stray light rays that can enter from the fill hole between the coupler frame and the bubble chamber. This design improves the system contrast when bubbles are present by reducing or eliminating the reflections of the stray light rays.

Figure 14:
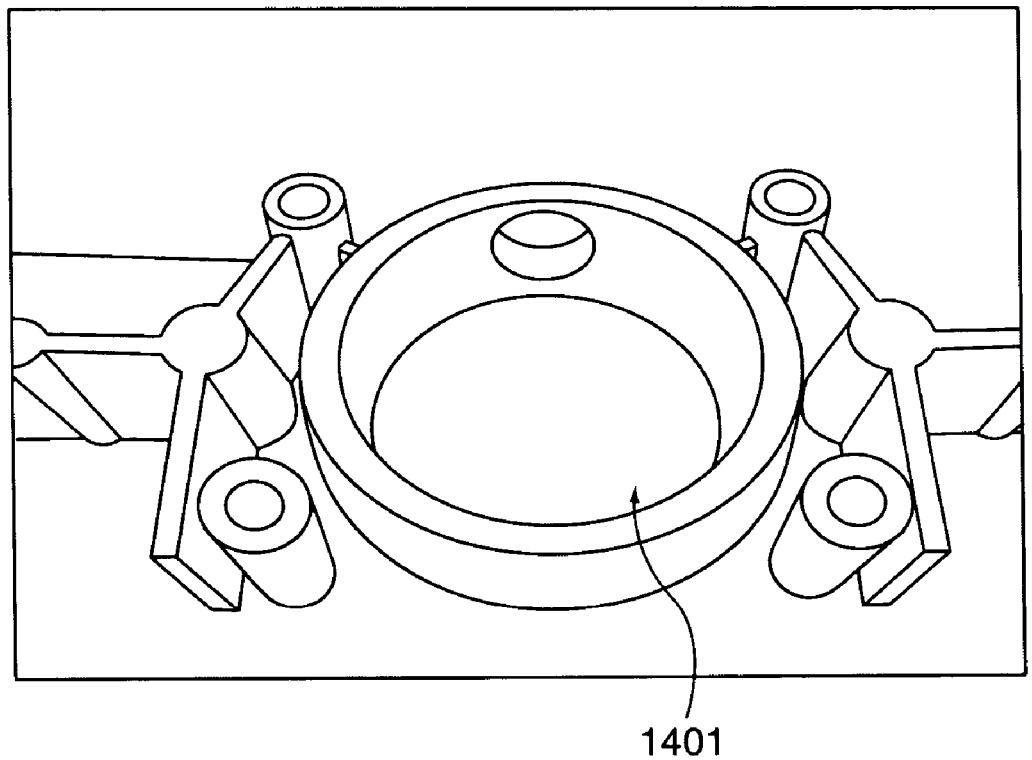
FIG. 14 shows an example of prior art expansion chambers that do not minimize skew light due to reflections from bubbles.

FIG. 14 shows an example of a prior art coupler that contains an expansion chamber that is not a bubble chamber due to the lack of a flat shelf area. In FIG. 14, the expansion chamber 1401 allows bubbles to form at the top of chamber in contact with stray light rays when it is placed in the projection assembly. No flat shelf area exists to shield the bubbles from the stray light rays.

Figure 15:
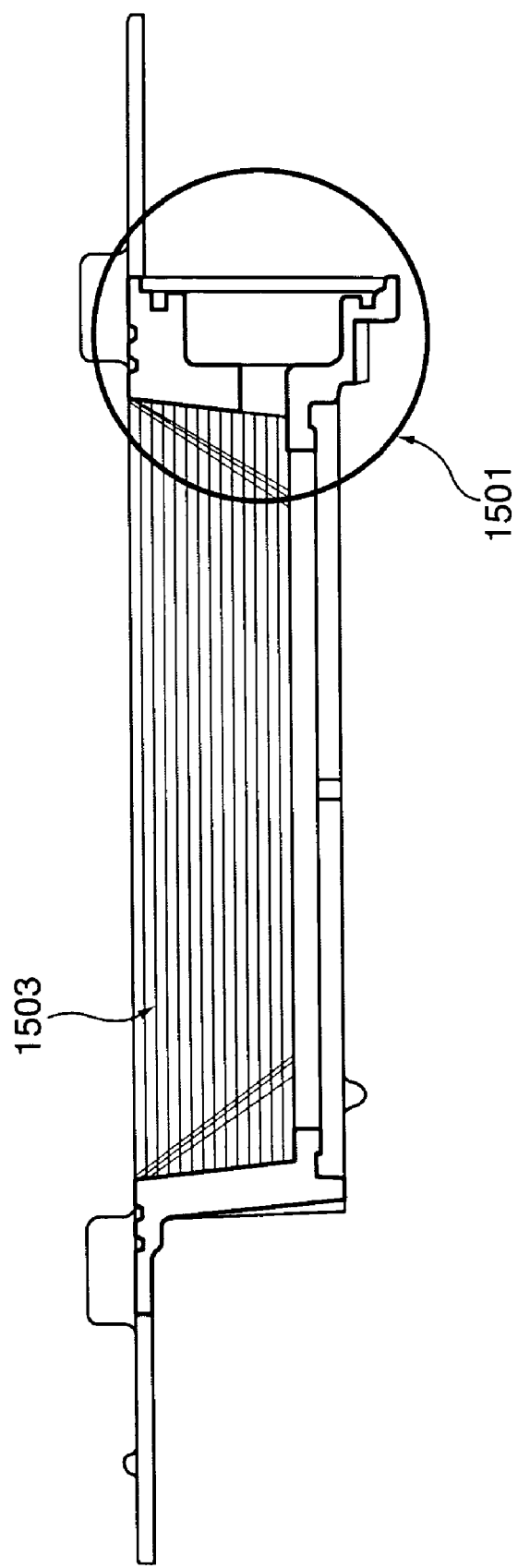
FIG. 15 shows a side view of the example of the bubble trap assembly.

FIG. 15 shows an illustration of a side view of the bubble trap system of the present invention. In the figure, the bubble trap area 1501 is shown at one end of the coupler frame 1503. The bubble trap 1501 contains a flat shelf area surrounding the fill hole. The coupler frame will be typically tilted in the end product (e.g., projection television) where the trap and coupler frame will be tilted between 60 degrees and 85 degrees relative to an upright 90-degree position with the bubble trap at the highest point. The preferred tilt range is between 70 to 80 degrees and will be selected based on the position of the other components on the projection assembly. The bubble trap can be tilted in either direction away from the 90-degree upright position. This will create an elevated area in the bubble trap where any air bubbles will collect. The inside chamber of the air bubble trap is preferably round for filling purposes but could be other shape configurations.

Figure 16:
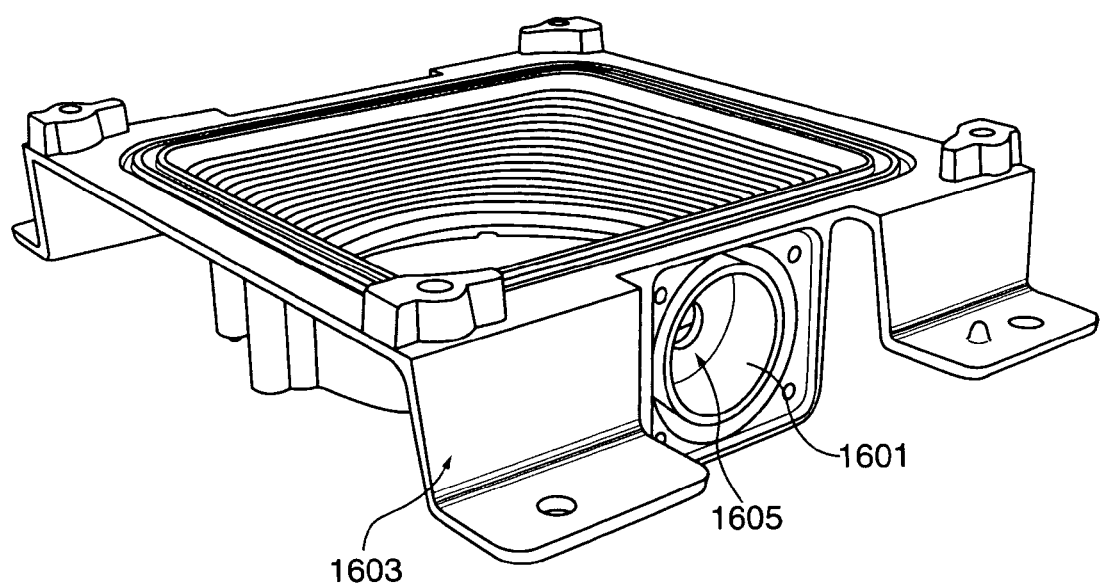
FIG. 16 shows an example of the bubble trap assembly.

FIG. 16 shows another illustration of a coupler assembly with the bubble trap in accordance with the present invention. The bubble trap 1601 is shown as an integral part of coupler 1603. The inside chamber of the bubble trap contains the shelf area 1605 that shields the bubbles from any stray light rays.

Figure 17:
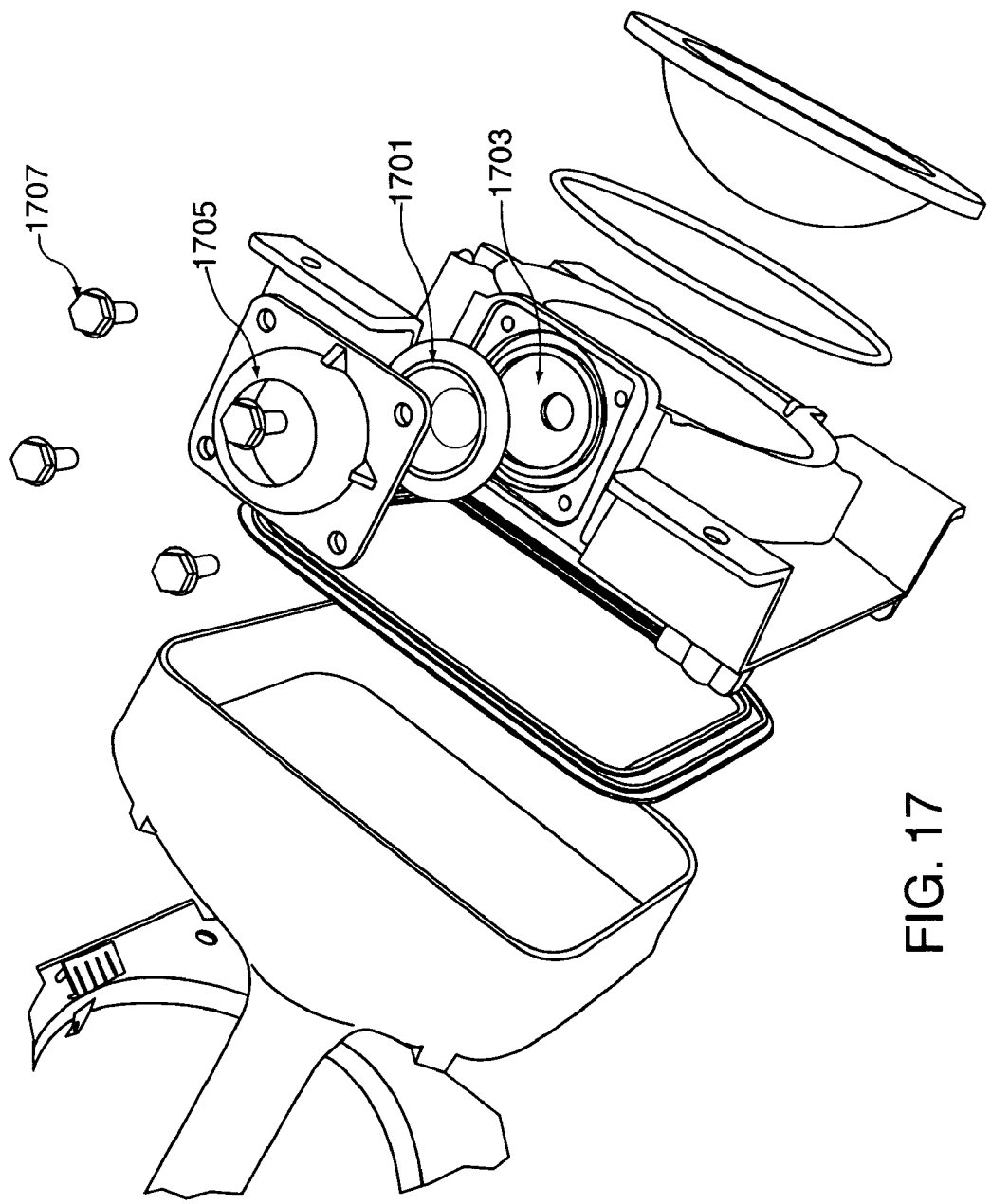
FIG. 17 shows an exploded view of the example of the bubble trap assembly.

FIG. 17 shows an exploded view of the coupler with bubble trap. A rubber seal 1701 is placed over the bubble trap 1703 after that cooling chamber is filled with liquid. The rubber seal allows space in the bubble chamber for bubbles to collect. The rubber seal is then secured by placing a cover 1705 over the rubber seal that is secured by screws 1707. The bubbles will collect in the area of the bubble trap that is most elevated in the projection system.

The bubble trap can be incorporated in any future coupler designs in projection systems to prevent the reflection of light from air bubbles. This design may also be incorporated in any future liquid coupled project system regardless of the projection media, including but not limited to LcoS, LCD, CRT and DMD systems.

Figure 18:
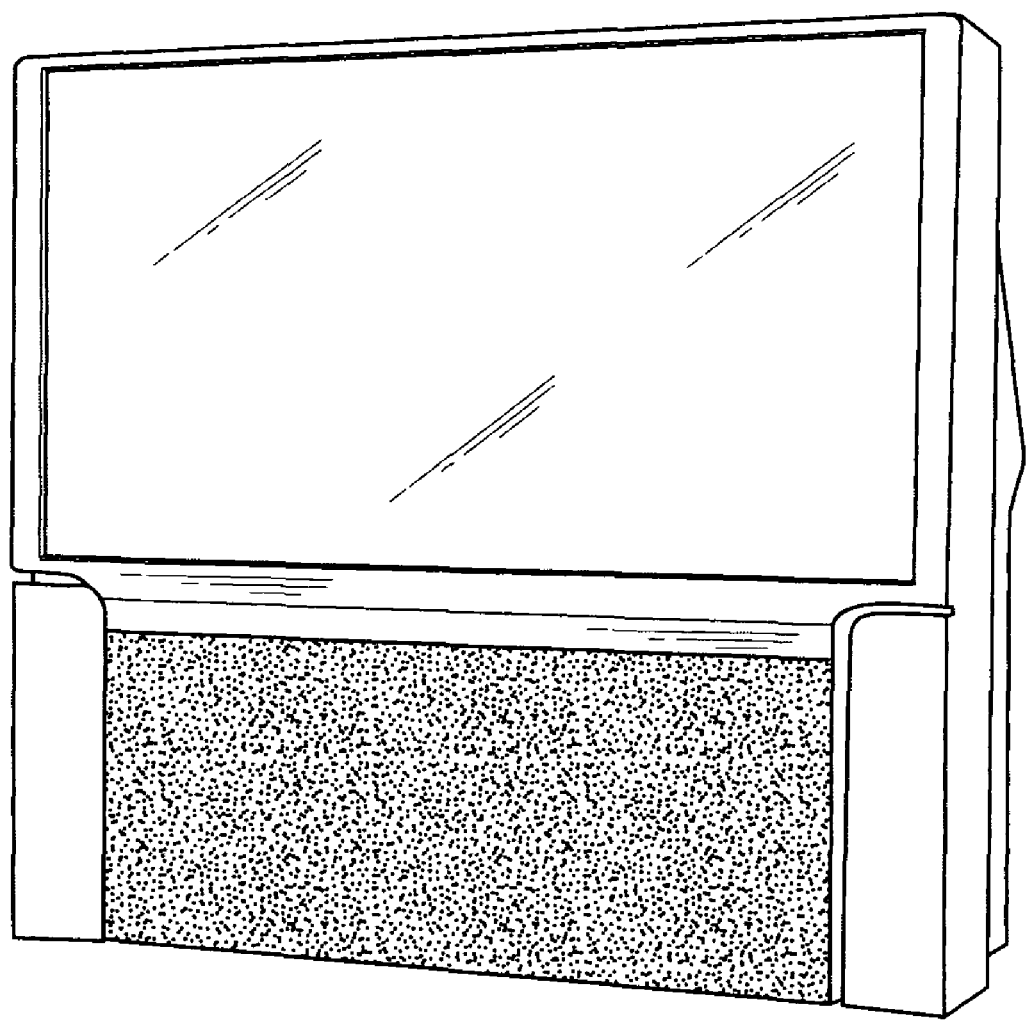
FIG. 18 shows an example of a projection television that contains the coupler of the present invention.

FIG. 18 shows an example of a projection television in which the coupler of the present invention can be used. The projection television contains a screen onto which the optical signals are projected.

While the present invention has been described with reference to the particular illustrative embodiments, it is not restricted to those embodiments. It is to be appreciated that those skilled in the art can change or modify the embodiments without departing from the scope and spirit of the invention.

I claim:

1. An apparatus for coupling a projection lens to a projection optical signal generating device, said apparatus comprising:
    an intergral frame portion for supporting said projection lens in alignment with said projection optical signal generation device; said
    frame portion forming a first and second opening at opposite ends and defining a cooling chamber between said projection lens and said projection optical signal generating device, wherein said cooling chamber is for containing a liquid; and
    a plurality of rigid contrast ribs extending from said frame's inner wall in said cooling chamber, wherein said plurality of contrast ribs extend into a substantially parallel plane to said frame's formed first and second openings,
    wherein said contrast ribs and adjcent troughs cover a surface area greater than seventy-five percent of the frame's inner wall's surface area of said frame's cooling chamber and wherein each of said contrast ribs is continuous around the circumference of said frame's inner wall's surface covered area.

2. The apparatus of claim 1, wherein said contrast ribs in said inner wall are rounded in shape.

3. The apparatus of claim 1, wherein said contrast ribs in said inner wall are triangular in shape.

4. The apparatus of claim 1, wherein said contrast ribs in said inner wall are rectangular in shape.

5. The apparatus of claim 1, wherein said contrast ribs are integrally formed by creating grooves in said inner wall of said frame.

6. The apparatus of claim 1, wherein said optical signal generating device comprises a cathode ray tube.

7. The apparatus of claim 1, wherein said contrast ribs are coated with a light absorbent material.

8. The apparatus of claim 1, wherein each of said contrast rib's height extending from said frame's inner wall is substantially similar along each said contrast rib.

9. The apparatus of claim 1, wherein said contrast ribs are integrally formed during said frame's casting process.

10. The apparatus of claim 1, wherein said contrast ribs are integrally formed by machining said frame after said frame is cast.

11. A projection system for producing an image to be displayed on a screen, comprising:
   a projection lens;
   a projection optical signal generating device; and
   a coupler device comprising an integral frame for supporting said projection lens in alignment with said projection optical signal generation device and defining a cooling chamber between said projection lens and said projection optical signal generating device; wherein said cooling chamber is for containing a liquid;
   wherein said frame's inner walls comprise a plurality of rigid contrast ribs for reducing reflections of skew rays on the projection lens originating from said projection optical signal generating device,
   wherein said contrast ribs and adjacent troughs cover a surface area greater than seventy-five of the frame's inner wall's surface area of said frame's cooling chamber and wherein each of said contrast ribs is continuous around the circumference of said frame's inner wall's surface covered area.

12. The system of claim 11, wherein said contrast ribs in said inner wall are rounded in shape.

13. The system of claim 11, wherein said contrast ribs are coated with a light absorbent material.

14. The system of claim 11, wherein each of said contrast rib's height extending form said frame's inner wall is substantially similar along each said contrast rib.

* * * * *